UNITED STATES PATENT OFFICE.

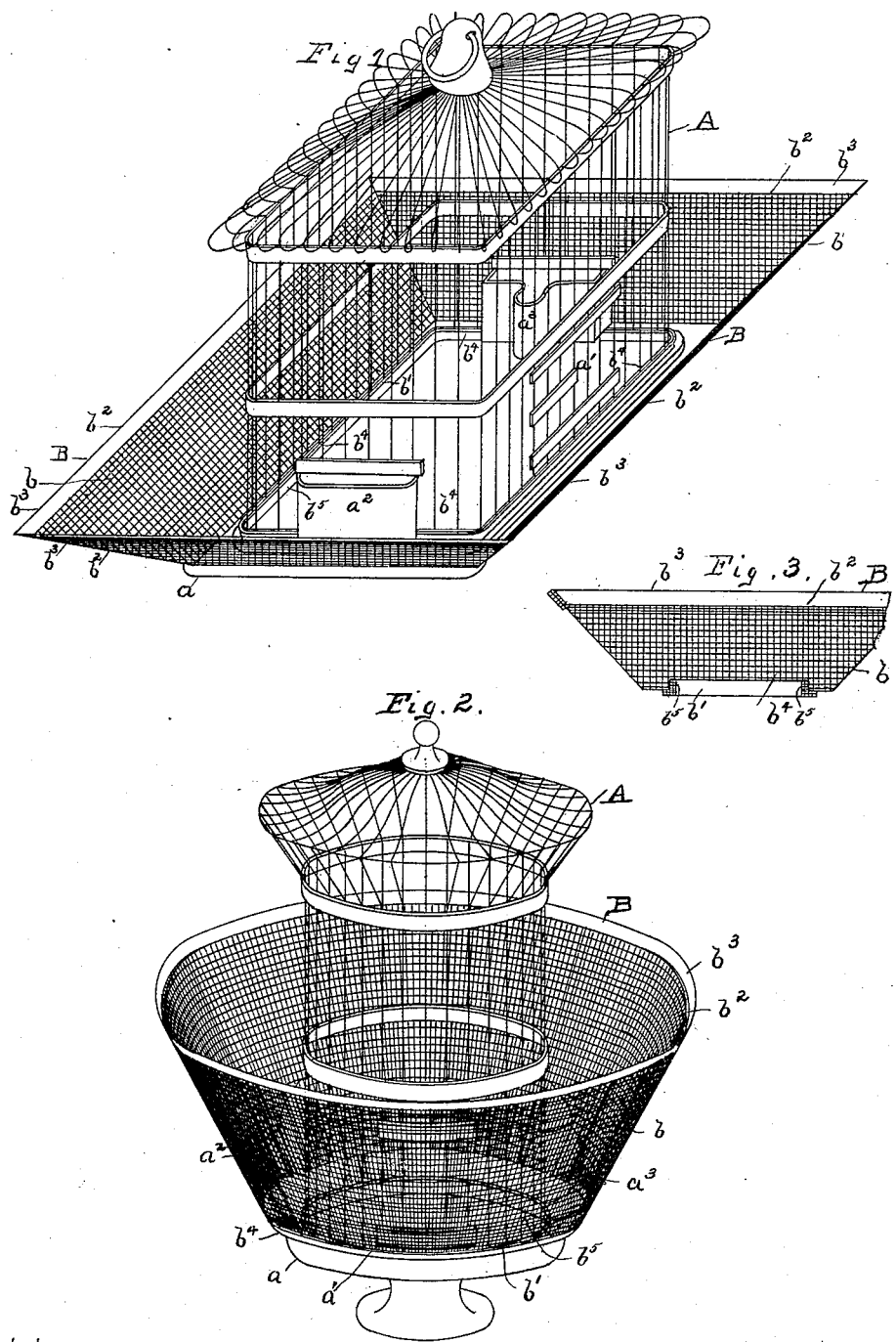

MARTIN G. LEONARD, OF LOWELL, MASSACHUSETTS, ASSIGNOR OF ONE-FOURTH TO EDGAR G. LEONARD, OF SAME PLACE.

BIRD-CAGE SCREEN.

SPECIFICATION forming part of Letters Patent No. 429,196, dated June 3, 1890.

Application filed July 12, 1888. Renewed January 17, 1890. Serial No. 337,180. (No model.)

*To all whom it may concern:*

Be it known that I, MARTIN G. LEONARD, a citizen of the United States, residing at Lowell, in the county of Middlesex and Commonwealth of Massachusetts, have invented a certain new and useful Improvement in Bird-Cage Screens, of which the following is a specification.

My invention relates to bird-cage screens; and it consists in the screen hereinafter described and claimed, said screen having upwardly-flaring sides and a central opening to receive and fit the cage above the floor thereof, and being adapted to rest upon that part of said floor which projects beyond the cage, and the object of said screen being to catch and retain waste from the cage.

In the accompanying drawings, Figure 1 is an isometric perspective view of a bird-cage rectangular in horizontal cross-section and my improved screen applied thereto. Fig. 2 is a similar view of a bird-cage and my improvement, the cage and screen being circular in horizontal cross-section; Fig. 3, a vertical central section of the rectangular screen shown in Fig. 1.

A in Fig. 1 is a wire bird-cage of ordinary construction and substantially rectangular in horizontal cross-section; $a$, its removable floor; $a'$, its swinging door; $a^2$ $a^3$, cups for holding bird-seed and water, and each held in place by friction between two of the vertical bars of the same, and a tongue which projects from the cup into said cage between said bars, all these parts being of the usual construction and operation.

The body $b$ of the screen B is formed of wire-cloth and has a central opening $b'$ of a shape and size to receive and fit the body of the cage A. From the central opening $b'$ the sides $b^2$ of the screen flare upward, as represented, the screen being given this form, preferably, by swaging or striking up. The outer and inner edges $b^3$ $b^4$, respectively, of the screen are stiffened and protected by a binding of sheet metal. The screen is applied to the cage by removing the floor of the cage in the usual manner and inserting the body of the cage within the central opening of the screen and then securing said floor again to the body of the cage, allowing the screen to rest upon the parts of the floor which project beyond the vertical bars of the cage. The sheet-metal binding $b^4$ around the central opening of the screen is turned up or provided with a vertical flange $b^5$ deep enough to rest against the bottoms of the cups $a^2$ $a^3$, which will assist in keeping the screen in its proper place. When it is desired to open the door of the cage farther than the screen in its usual position will allow of, the cups $a^2$ $a^3$ may be removed in the usual manner and the screen raised above the door $a'$.

The screen shown in Fig. 2 is like that shown in Fig. 1, except that all its horizontal sections are circular to allow it to be applied to the cylindrical body of the bird-cage. (Shown in Fig. 2.)

The screen may be made of other material than wire-cloth, as of sheet metal, perforated or otherwise.

The flange $b^5$ will tend to prevent the tilting of the screen, whether it be deep enough to reach to the cups $a^2$ $a^3$ or not.

I claim as my invention—

A bird-cage screen having a central opening to receive and fit the body of a bird-cage above the floor of said cage and adapted to be supported on said floor outside of said body and having around its central opening a vertical flange, as and for the purpose specified.

In witness whereof I have signed this specification, in the presence of two attesting witnesses, this 5th day of July, A. D. 1888.

MARTIN G. LEONARD.

Witnesses:
ALBERT M. MOORE,
MYRTIE C. BEALS.